March 31, 1959 M. BELAMIN 2,880,386
FLUX REVERSAL CIRCUIT FOR RECTIFIERS
Filed Nov. 2, 1955 2 Sheets-Sheet 1

INVENTOR.
MICHAEL BELAMIN
BY Ostrolenk, Faber
Gerb, & Soffen
ATTORNEYS

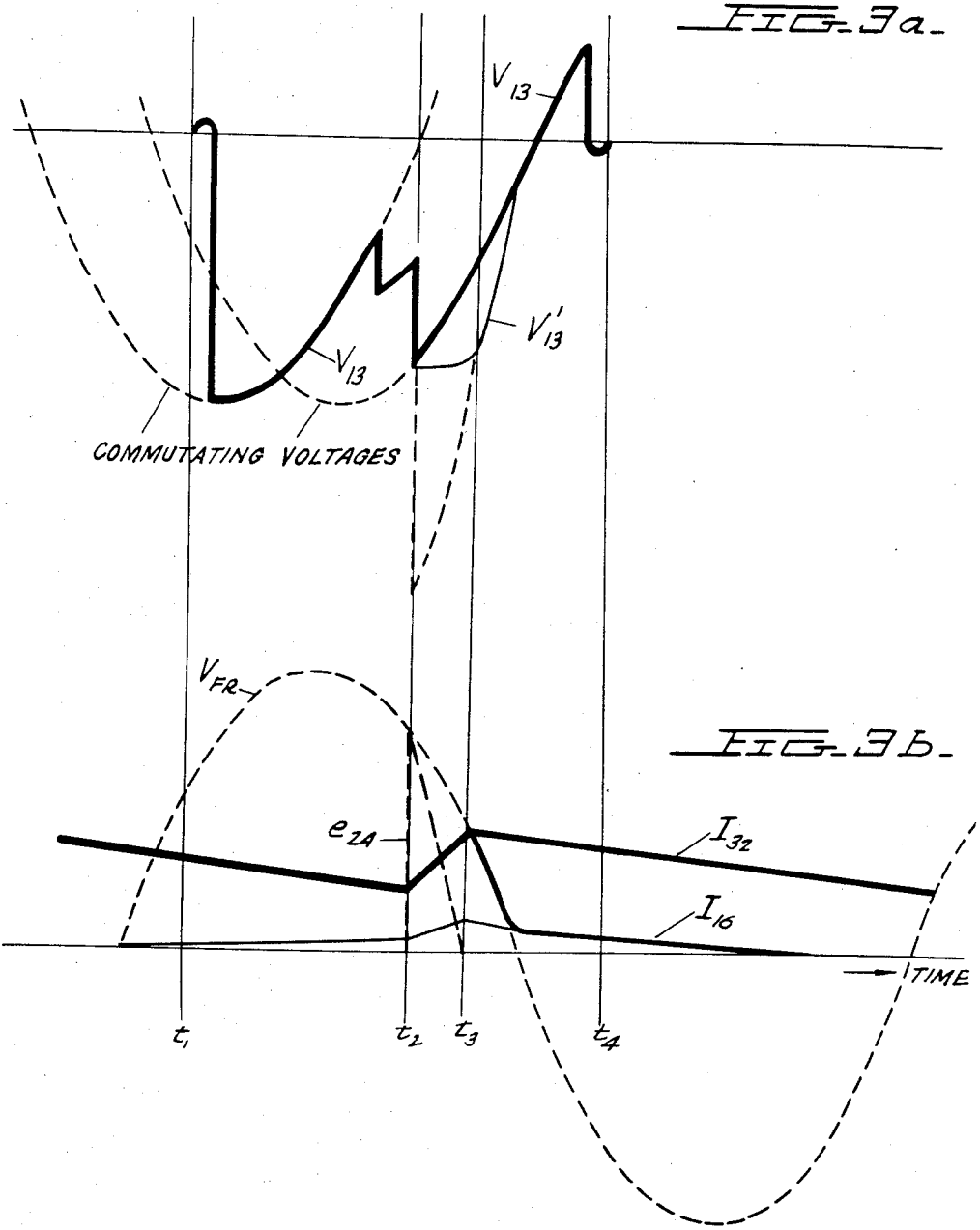

United States Patent Office 2,880,386
Patented Mar. 31, 1959

2,880,386

FLUX REVERSAL CIRCUIT FOR RECTIFIERS

Michael Belamin, Nurnberg, Germany, assignor to Siemens-Schuckertwerke A.G., Berlin and Erlangen, Germany, a corporation of Germany Application November 2, 1955, Serial No. 544,526

Claims priority, application Germany November 17, 1954

11 Claims. (Cl. 321—48)

My invention relates to flux reversal circuits for mechanical or electromagnetic rectifiers and more specifically to a means for eliminating the high peak voltage which appears across the open contacts of a contact rectifier when using the type flux reversal circuit as shown in co-pending applications Serial No. 486,243, filed February 4, 1955 and Serial No. 544,507 filed November 2, 1955.

Mechanical and electromagnetic rectifiers have been clearly described in copending applications Serial No. 423,358, filed April 15, 1954, now Patent No. 2,817,805, and Serial No. 257,398, filed November 20, 1951, now Patent No. 2,756,380, respectively, and in essence comprise a contact which is mechanically or electromagnetically operated to synchronously connect and disconnect an A.-C. source from a D.-C. load. By closing the contact when the A.-C. voltage begins to go positive and opening the contact before the A.-C. voltage becomes negative it is seen that an average voltage will be transmitted to a D.-C. load connected in series with the A.-C. source and the contact.

In order to protect the contact from destruction, it has been found necessary to provide a low current step in which the contact is to be operated into or out of engagement. This low current step is provided by a commutating reactor which is a reactor connected in series with the contact and has a core of highly saturable material. Commutating reactors and their operation are fully described in copending application Serial No. 423,357, filed April 15, 1954.

In order to regulate the output voltage of the rectifier when connected in the so-called six coil connection for rectifying a three phase alternating current source, the flux of the commutating reactor of each phase is reversed by a predetermined amount prior to the closure of its associated contact. Therefore, after contact closure, the A.-C. voltage will appear across the commutating reactor and only after this reactor saturates will the voltage appear on the load. Obviously by adjusting the amount of flux reversal of the commutating reactor, the voltage output of the rectifier may be controlled.

As set forth in the above noted applications Serial No. 486,243 filed February 4, 1955 and Serial No. 544,507 filed November 2, 1955, flux reversal is effected by means of a flux reversal circuit connected to an auxiliary commutating reactor winding. The current supplied by this flux reversal circuit outside of the flux reversal interval of each cycle is limited by means of a series connection of a saturable reactor and a rectifier to a value insufficient to cause flux change in the commutating reactor. That is to say, that outside of the flux reversal interval of the commutating reactor, the flux reversal circuit current is limited either by the unsaturated saturable reactor or the reverse current of the rectifier, either of these currents being lower than the magnetizing current of the commutating reactor as seen from its auxiliary or flux reversal winding.

The saturable reactor is then provided with a D.-C. bias current, the voltage time integral which the saturable reactor absorbs in one of the two half cycles of the input alternating voltage of the flux reversal circuit being set to a desired value. During the following half cycle the voltage remains on the saturable reactor winding until the voltage time integral has again been consumed and the remainder of the half cycle voltage then effects the flux reversal of the commutating reactor.

At the beginning of this flux reversal interval, a relatively high peak voltage appears on the commutating reactor flux reversal winding which is transformed to the main winding of the commutating reactor and then superimposed on the voltage appearing across the open contact in series with the commutating reactor main winding. This additional voltage may unduly increase the voltage load across the open contact particularly if at the above-mentioned time the difference in the voltage across the contact between its own and the preceding phase has a relatively high instantaneous value which approaches its maximum value.

The principle of my invention is to provide an impedance in the flux reversal circuit which, in view of the high inrush current drawn from the flux reversal circuit by the commutating reactor when the commutating reactor flux begins to reverse, will have a voltage drop which will subtract from the voltage appearing across the commutating reactor flux reversal winding. During the flux reversal process within the commutating reactor core, the current drawn by the commutating reactor flux reversal winding will decrease as will the voltage appearing across the contact associated with the commutating reactor in question. Hence a decreased voltage will appear across the impedance of my novel invention and the voltage appearing across the commutating reactor winding will increase. This increase in voltage which will be transformed to the commutating reactor main winding is now allowable since the phase voltage appearing across the contact has decreased and the net voltage will still be below a dangerous value.

Accordingly, the primary object of my invention is to provide a flux reversal circuit which will not transform a dangerously high voltage across the open contact of an associated commutating reactor.

Still another object of my invention is to provide a flux reversal circuit for a commutating reactor which includes a saturable reactor for controlling the voltage time integral appearing across the commutating reactor flux reversal winding and an impedance which will provide a voltage drop to thereby decrease the instantaneous voltage appearing across the commutating reactor flux reversal winding when the commutating reactor core begins to be unsaturated by the flux reversal circuit.

These and other objects of my invention will become apparent when taken in conjunction with the figures in which:

Figure 1 shows a circuit diagram of a mechanical rectifier having a flux reversal circuit constructed in accordance with my novel invention.

Figure 2 shows a second embodiment of my novel invention.

Figures 3a and 3b show the voltage, current, time relationships of the circuits of Figures 1 and 2.

Referring now to Figure 1, I have shown a three phase mechanical rectifier to which my flux reversal circuit may be applied.

It will be apparent to those skilled in the art that my novel circuit can also be applied to an electromagnetic rectifier in substantially the same manner as will hereinafter be described.

The main A.-C. source 25 is applied to the primary windings 27a, 27b and 27c of the star connected three phase transformer 26. The secondary windings 11a, 11b and 11c of the transformer 26 are respectively connected to the main windings 12a, 12b, and 12c of commutating reactors 23a, 23b, and 23c respectively which have mechanically operated contacts 13a, 13b and 13c respectively connected in series therewith. The series connection of the mechanically operated contacts 13a, 13b, and 13c and the main commutating reactor windings 12a, 12b, and 12c are in turn connected to one end of the load 14. The opposite end of the load 14 is connected to a smoothing choke 15 which in turn is connected to the secondary neutral of the transformer 26.

I have illustrated my invention as applied to phase A of the rectifier, as it will be apparent that the identical circuitry will also be applied to the commutating reactor of phases B and C.

The commutating reactor 23 is provided with a flux reversal winding 16 which is connected in series with the accessory rectifier 17 and an output winding 18 of the transductor or saturable reactor 22. In order to simplify this application, the driving means which drives the contact 13 into and out of engagement is schematically shown as the motor M although it is clear that this driving means could have been electromagnetic as well as mechanical. Similarly, the various pre-excitation circuits which may act on the commutating reactor 23 have been eliminated and may be seen in conjunction with copending application Serial No. 470,705 filed November 23, 1954.

The flux reversal circuit of my novel invention is now shown in Figure 1 and includes the diode 17, transductor 22, and variable impedance 30 which in the case of Figure 1 is an adjustable resistor. More specifically, resistor 30, winding 18 of transductor 22, diode 17, and flux reversal winding 16 of the commutating reactor 23 are connected in series and energized from a source of A.-C. voltage which is taken from the main power transformer 26. Transductor 22 is then further provided with a D.-C. bias which is energized from a voltage source 31 and includes the series connection of variable resistor 21, winding 19 and smoothing choke 20. This type of connection, as has been shown in copending application Serial No. 486,243 filed February 4, 1955 is effective to control the flux of transductor 22 which in turn will control the degree of flux reversal of the commutating reactor 23. As further shown in Figure 1, the flux reversal circuit energization is more precisely taken from a tap of the preceding phase voltage in order to obtain a slightly leading voltage than that of the main input voltage to the rectifier. If desired this energization source could have been taken from an auxiliary winding or any other desired source having a proper phase relationship to the phase of the commutating voltage which will appear across the contact 13a.

It should be noted that if desired the source of D.-C. voltage 31 could be made to vary as a function of the input alternating voltage at the transformer 26 as is set forth in copending application Serial No. 544,507 filed November 2, 1955 so that amplification of voltage variations at the input voltage source 26 will not be had across the load 14.

Reference to Figure 2 indicates that this figure is identical to Figure 1 with the exception of the impedance 30 of Figure 1 being replaced by the impedance shown generally at 31' in Figure 2. Operation of the circuits of Figures 1 and 2 may now be taken in conjunction with the voltage, current, time diagram of Figures 3a and 3b.

Figure 3a shows the commutating voltage that appears between the three phases of either Figure 1 or 2 in dotted lines and the heavy line represents the voltage $v_{13}$ which would appear across the open contact 13 of phase A of either Figure 1 or 2. In Figure 3a, $t_1$ represents the point of contact opening of the contact 13 and $t_2$ represents the initiation of commutation between a third phase and phase A prior to the time of contact closure of contact 13 of phase A at time $t_4$. In Figure 3b the voltage $v_{fr}$ is shown as the voltage which will be impressed upon the flux reversal circuit, this voltage having a reverse polarity and a small lead as compared to the commutating voltage shown in the dotted lines of Figure 3a.

It will now be assumed that the transductor 18 of Figures 1 or 2 will saturate at the time $t_2$ and the flux reversal voltage is impressed across the flux reversal winding 16 of the commutating reactor 23 at this time. It is important to note that this would be the worst condition possible since the commutating voltage across the contact 13 at time $t_2$ is at its highest level and the addition of an extra voltage transformed into the commutating reactor winding 12 may cause a high enough voltage to appear across the contact 13 to cause a flash-over of this contact. This condition may be seen in Figure 3a assuming the absence of any impedance such as the impedance 30 or 31' of Figures 1 or 2 in the flux reversal circuit. Hence, at the time $t_2$ a voltage will be induced and added to the commutating voltage appearing across the contact 13 to give a total voltage as shown in the dotted line of Figure 3a at the time $t_2$. It is seen that this instantaneous voltage across the contact 13 may indeed be high enough to overload the contact in a dangerous manner.

The appearance of this peak voltage however is eliminated by my novel circuit which includes the insertion of an impedance in series with the flux reversal circuit.

More specifically, in the case of Figure 1 the resistor 30 will assume an appreciable part of the flux reversal voltage $v_{fr}$ at the time $t_2$ to thereby allow an appreciably smaller voltage to be impressed across the winding 16 of the commutating reactor 23 and hence to transform an appreciably reduced voltage into the main winding 12 of the commutating reactor 23.

It may be understood that a relatively high voltage will appear across resistor 30 at the time $t_2$ when it is realized that immediately upon entering the unsaturated state, commutator reactor winding 16 must supply the relatively high fagnetizing current of the commutating reactor 23 as well as the current drain on other commutating reactor windings such as pre-excitation windings and biasing windings which have not been shown in this application but may be seen in copending application Serial No. 423,357 filed April 15, 1954.

Reference to Figure 3a now shows that after the time $t_2$ the contact voltage $v_{13}$ decreases and a higher voltage may now be induced into the winding 12 without approaching a dangerous total voltage across the winding 13a. This will in fact be the case since after the time $t_2$ the inrush current which is to be supplied by the winding 16 is decreased and a smaller voltage drop will take place across the resistor 30 thereby allowing a higher magnitude of voltage to appear on the winding 16.

It is therefore apparent that the use of an adjustable resistor 30 as shown in Figure 1 will appreciably reduce the peak voltage shown in the dotted line in Figure 3a which will appear across the disengaged contact 13 of phase A.

It is to be noted that since the resistor 30 takes a portion of the voltage time integral which would have been supplied to the commutating reactor 16 that the degree of flux reversal of the commutating reactor will be reduced. Hence to achieve the same degree of reversal, the flux reversal must be begun at an earlier time than in the case of the circuit which does not utilize a resistor such as 30. That is to say that the transducer 22 must be allowed to saturate at an earlier time.

In the circuit of Figure 2 the impedance in the flux reversal circuit in accordance with my novel invention is shown as comprising the system shown generally at 31'. It is seen that the system 31' comprises the choke coil 32, diode 33, and a first and second auxiliary winding 34 and 35, the winding 35 being connected to a source of D.-C. power 36. It is further seen that the winding 34 is connected in series with the source of D.-C. power $E_{dc}$. The operation of the circuit of Figure 2 may be more clearly understood when referring to the plots of $I_{32}$ as a function of time and $I_{16}$ as a function of time as shown in Figure 3b.

At the time $t_2$ at which reactor 22 saturates, it has been seen that a relatively high peak voltage will be induced across the open contact 13 as shown in the dotted lines of Figure 3a. Since, however, a reactor 32 is now connected in series with the flux reversal circuit, a rapid increase of current will be presented and a portion of the voltage of the source $v_{tr}$ will fall across this reactor 32. As seen in Figure 3b, the current through the choke 34 begins to increase at a time $t_2$ to a maximum value at time $t_3$ during which time a voltage $e_{24}$ appears thereacross. At the time $t_2$ it is seen that this voltage $e_{24}$ is substantially equal to the voltage of the flux reversal circuit and that the only voltage appearing across the open contact would be the commutating voltage between its own phase and the preceding one. In view of this absorption of voltage by the choke 34, the total voltage appearing across the open contact 13 may now be seen with reference to Figure 3a as the light solid line $v_{13}'$ which voltage is appreciably smaller than the peak voltage shown in the dotted lines that would have appeared across the open contact in the absence of the impedance in the flux reversal circuit.

Here again the degree of flux reversal in the commutating reactor is reduced in view of the volt seconds absorbed on the winding 34 and for a given amount of flux reversal, the transductor 18 would have to saturate at an earlier time.

To obtain a desired plot of contact voltage beginning at the flux reversal of the commutating reactor 23, the reactor 31a may be provided with a particular magnetic characteristic such that the reactor 31a will have a decreasing inductance as it approaches saturation at time $t_3$. Preferably the plot of the reactor 31a should be adjusted to the particular commutating reactor whereby a change in the length of unsaturation of the commutating reactor would be matched by a similar change in the length of unsaturation of the reactor 31a.

The biasing windings 34 and 35 are provided to operate in a manner that will maintain the length of unsaturation of the reactor 31a equal or substantially equal to the length of unsaturation of the commutating reactor 23 during its flux reversal interval. This may be accomplished by energizing the windings 34 and 36 by their corresponding D.-C. sources in such a manner as to vary the step for length of unsaturation of the reactor 31a in accordance with the amount of D.-C. current flowing through the winding 34 which is a measure of the length of time during which the commutating reactor 23 is unsaturated for flux reversal purposes. Hence when the voltage of the flux reversal circuit is in such a direction as to pass current in a direction through the coil 32 which opposes the direction of the diode 33, the flux which will be reversed is determined by the difference between the D.-C. ampere turns supplied from the source 36 to the winding 35 and from the source $E_{dc}$ to the winding 34. By decreasing the ampere turns supplied to winding 34 which would imply a longer flux reversal interval for the commutating reactor 23, the amount of flux reversal which is given by the difference between the ampere turns of windings 35 and 36 will have to be overcome by the winding 32 before the reactor 31a will finally saturate. Hence, the length of time of unsaturation of reactor 31a can be made to match the length of unsaturation during the flux reversal interval of the commutating reactor 23.

In the foregoing, I have described my invention solely in connection with specific illustrative embodiments thereof. Since many variations and modifications of my invention will now be obvious to those skilled in the art, I prefer not to be bound by the specific disclosures therein contained but only by the appended claims.

I claim:

1. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source, an impedance and a direct voltage source; said second alternating voltage source being connected in series with said transductor output winding, said diode, said impedance and said commutating reactor flux reversal winding; said D.-C. voltage source being connected in series with said transductor bias winding, said second alternating voltage source being constructed to have a voltage magnitude as a function of the voltage magnitude of said first A.-C. source; said direct voltage source being constructed to have a voltage magnitude as a function of the voltage magnitude of said first A.-C. source.

2. In a rectifier device for energizing a D.-C. load from a first A.-C. source, said rectifier comprising a commutating reactor and a rectifying element; said commutating reactor comprising a main winding, a flux reversal winding and a magnetic core; said first A.-C. voltage source, commutating reactor winding, rectifying element and D.-C. load being connected in series; a flux reversal circuit, said flux reversal circuit including a transductor having a bias winding and an output winding, a diode, a second alternating voltage source, an impedance and a direct voltage source; said second alternating voltage source being connected in series with said transductor output winding, said diode, said impedance and said commutating reactor flux reversal winding; said D.-C. voltage source being connected in series with said transductor bias winding.

3. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source, an impedance and a direct voltage source; said second alternating voltage source being connected in series with said transductor output winding, said diode, said impedance and said commutating reactor flux reversal winding; said D.-C. voltage source being connected in series with said transductor bias winding; said impedance being effective to decrease the voltage impressed on said commutating reactor flux reversal winding when said transductor saturates.

4. In a rectifier device for energizing a D.-C. load from a first A.-C. source, said rectifier comprising a commutating reactor and a rectifying element; said commutating reactor comprising a main winding, a flux reversal winding and a magnetic core; said first A.-C. voltage source, commutating reactor winding, rectifying element and D.-C. load being connected in series; a flux reversal circuit, said flux reversal circuit including a transductor having a bias winding and an output winding, a diode, a second alternating voltage source, an impedance and a direct voltage source; said second alternating voltage source being connected in series with said transductor output winding, said diode, said impedance and said commutating reactor flux reversal winding; said D.-C. voltage source being connected in series with said transductor bias winding; said impedance comprising a resistor being effective to decrease the voltage impressed on said commutating reactor flux reversal winding when said transductor saturates.

5. A rectifier having a commutating reactor, main contacts and a transductor; said commutating reactor having a flux reversal winding and a main winding; said transductor having a biasing winding and an output winding; said transductor output winding and said commutating reactor flux reversal winding connected in series with a rectifier, an impedance and an alternating current source; said biasing winding connected in series with a variable impedance and a direct current source; said main winding of said commutating reactor connected in series with said main contacts; said variable impedance effective to adjust the make step for said main contacts, said direct current source being energized from said alternating source whereby the voltage of said direct current source varies in accordance with variations in said alternating current source.

6. A rectifier having a commutating reactor, a main rectifying element and a transductor; said commutating reactor having a flux reversal winding and a main winding; said transductor having a biasing winding and an output winding; said transductor output winding and said commutating reactor flux reversal winding connected in series with a rectifier, an impedance and an alternating current source; said biasing winding connected in series with a variable impedance and a direct current source; said main winding of said commutating reactor connected in series with said main rectifier element; said variable impedance effective to adjust the make step for said main contacts.

7. A rectifier having a commutating reactor, main contacts and a transductor; said commutating reactor having a flux reversal winding and a main winding; said transductor having a biasing winding and an output winding; said transductor output winding and said commutating reactor flux reversal winding connected in series with a rectifier, an impedance and an alternating current source; said biasing winding connected in series with a variable impedance and a direct current source; said main winding of said commutating reactor connected in series with said main contacts; said variable impedance effective to adjust the make step for said main contacts; said impedance being effective to decrease the voltage impressed on said commutating reactor flux reversal winding when said transductor saturates.

8. A rectifier having a commutating reactor, main contacts and a transductor; said commutating reactor having a flux reversal winding and a main winding; said transductor having a biasing winding and an output winding; said transductor output winding and said commutating reactor flux reversal winding connected in series with a rectifier, an impedance and an alternating current source; said biasing winding connected in series with a variable impedance and a direct current source; said main winding of said commutating reactor connected in series with said main contacts; said variable impedance effective to adjust the make step for said main contacts; said impedance comprising a resistor being effective to decrease the voltage impressed on said commutating reactor flux reversal winding when said transductor saturates.

9. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source, an impedance and a direct voltage source; said second alternating voltage source being connected in series with said transductor output winding, said diode, said impedance and said commutating reactor flux reversal winding; said D.-C. voltage source being connected in series with said transductor bias winding; said impedance comprising an inductor, said inductor having a voltage appearing thereacross upon saturation of said transductor and current flow therethrough.

10. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source, an impedance and a direct voltage source; said second alternating voltage source being connected in series with said transductor output winding, said diode, said impedance and said commutating reactor flux reversal winding; said D.-C. voltage source being connected in series with said transductor bias winding; said impedance comprising an inductor, said inductor having a voltage appearing thereacross upon saturation of said transductor and current flow therethrough; said inductor being constructed to be unsaturated for substantially the same length of time that said commutating reactor flux is reversed by said flux reversal winding.

11. In a rectifier device for energizing a D.-C. load from a first A.-C. source, said rectifier comprising a commutating reactor, a pair of cooperable contacts and means for synchronously operating said cooperable contacts into and out of engagement; said commutating reactor comprising a main winding, a flux reversal winding and a magnetic core; said first A.-C. voltage source, commutating reactor winding, pair of cooperable contacts and D.-C. load being connected in series; a flux reversal circuit, said flux reversal circuit including a transductor having a bias winding and an output winding, a diode, a second alternating voltage source, an impedance and a direct voltage source; said second alternating voltage source being connected in series with said transductor output winding, said diode, said impedance and said commutating reactor flux reversal winding; said D.-C. voltage source being connected in series with said transductor bias winding; said impedance comprising an inductor, said inductor having a voltage appearing thereacross upon saturation of said transductor and current flow therethrough; said inductor being constructed to be biased by the current in said transductor winding and by a substantially constant D.-C. current whereby current in said commutating reactor will drive said inductor to saturation in substantially the same time that said commutating reactor flux reversal winding is energized to reverse the flux of said commutating reactor.

References Cited in the file of this patent

UNITED STATES PATENTS

| | | |
|---|---|---|
| 2,188,361 | Koppelmann | Jan. 30, 1940 |
| 2,568,140 | Belamin | Sept. 18, 1951 |

FOREIGN PATENTS

| | | |
|---|---|---|
| 497,758 | Great Britain | Dec. 28, 1938 |
| 730,186 | Germany | Jan. 8, 1943 |